(No Model.)
J. M. HOLLAND.
DITCHER AND GRADER.
No. 383,574. Patented May 29, 1888.
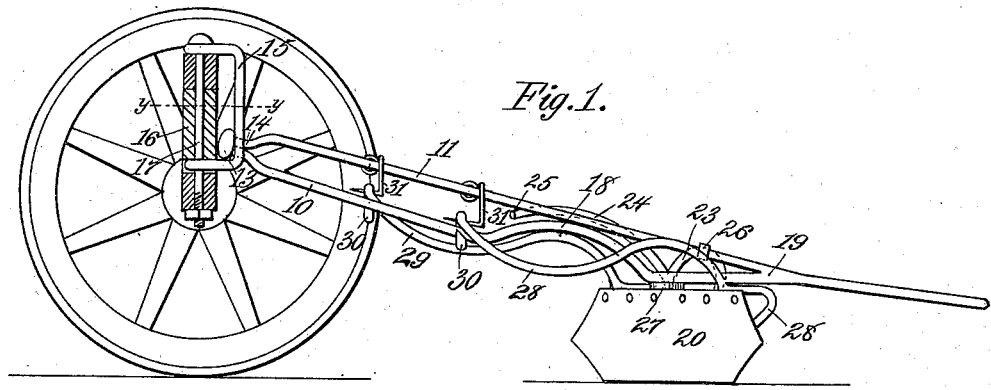
Fig. 1.
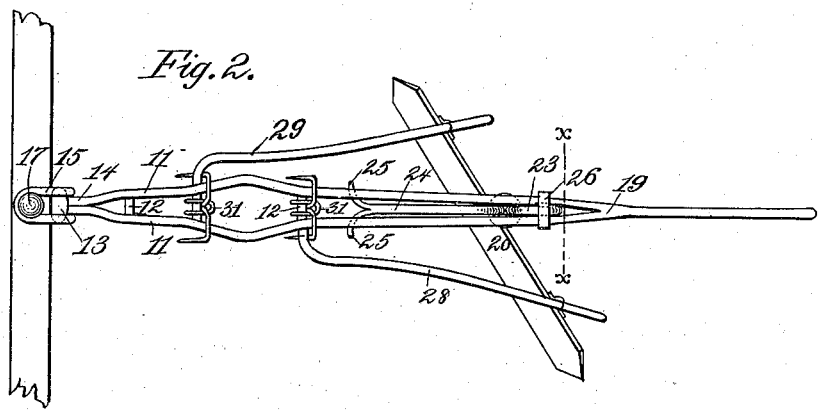
Fig. 2.
Fig. 3.
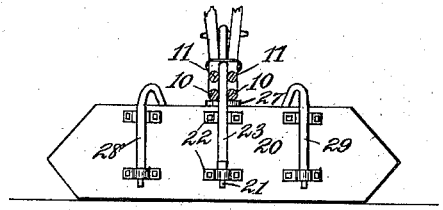
Fig. 4.
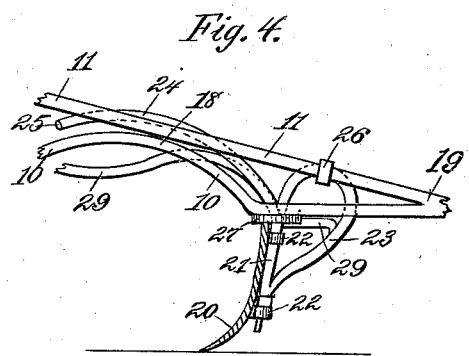
Fig. 5.
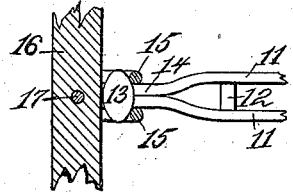
WITNESSES:
Wm. Twitchell
C. Sedgwick
INVENTOR:
J. M. Holland
BY Munn & Co
ATTORNEYS.
N. PETERS, Photo-Lithographer, Washington, D. C.

UNITED STATES PATENT OFFICE.

JAMES M. HOLLAND, OF MOUNT PLEASANT, IOWA.

DITCHER AND GRADER.

SPECIFICATION forming part of Letters Patent No. 383,574, dated May 29, 1888.

Application filed August 24, 1887. Serial No. 247,736. (No model.)

*To all whom it may concern:*

Be it known that I, JAMES M. HOLLAND, of Mount Pleasant, in the county of Henry and State of Iowa, have invented a new and Improved Ditcher and Grader, of which the following is a full, clear, and exact description.

This invention relates to a novel form of implement that is applicable for use in the ditching and grading of highways or other roads, the object of the invention being to provide a ditching blade or shovel which shall be reversible, and which shall be so connected to the wagon or vehicle in connection with which it is arranged that it will be free to conform to the contour of the ground over which it is passing.

Reference is to be had to the accompanying drawings, forming a part of this specification, in which similar figures of reference indicate corresponding parts in all the views.

Figure 1 is a side view of my improved grader and ditcher, the forward axle and the bolster to which the apparatus is connected being shown in section. Fig. 2 is a plan view of the device. Fig. 3 is a rear view, partly in section. Fig. 4 is a broken side view, partly in section; and Fig. 5 is a sectional detail view taken on line *y y* of Fig. 1.

In constructing such an implement as the one illustrated in the drawings above referred to I provide a suitable main frame—as, for instance, two main supporting-bars, 10, that are connected at each end to upper bars, 11, said bars 11 being in turn connected by cross-bars 12, and acting as trusses for the support of the lower bars, 10. The forward ends of the bars 10 and 11 are brought together and connected to a knob, 13, the neck 14, just behind the knob 13, resting within a slide or clevis-link, 15, that is secured above the forward axle of the vehicle in connection with which the grader and ditcher is to be employed, the slide being held to a bolster, 16, by the vehicle king-bolt 17, as is clearly shown in Fig. 1.

The forward portions of the bars 10 and 11 are substantially parallel; but the rear portions of the bars 10 are bent upward and connected to the bars 11 at the point 18, the bars 10 being again carried from the bars 11, to be once again connected thereto at the point 19.

The blade 20 of the machine is secured to a standard, 21, by keepers 22, and said standard is preferably formed with an integral rearwardly-bowed arm, 23, and with an integral forwardly extending arm, 24, the latter having a forked end, 25 25, the forks extending laterally between the bars 10 11. A band, 26, secures the bowed arm 23 to the bars 11, while the forks 25 serve to hold the forward arm, 24. Constructed in this form, the standard affords a strong support for the blade 20.

The arms 23 24 of standard 21 extend upward between the bars 10, the said bars at this point being horizontal, or approximately so, and beneath the said bars 10 a disk or washer, 27, is placed on the standard to receive the wear.

At points near each end of the blade 20 I pivotally connect draw bars or irons 28 and 29, these irons being formed with hooks 30, which engage respectively with the right and left hand bars 10, the arrangement being such that by carrying the bar 28 forward the bar 29 will be carried to the rear and the blade or shovel 20 will be set to deliver the earth to the left; but if it is desired to deliver the earth to the right the bar 29 is carried forward and the bar 28 to the rear.

The cross-bars 12 carry hooks 31, which may be brought into engagement with the hooks 30, acting to hold the bars upon which the hooks are formed in the required position.

It will of course be understood that instead of the hooks 30 any other proper connection could be made between the bars 10 and the bars 28 and 29.

The draw-bars 28 29 are preferably formed with a rearwardly-extending bowed arm, similar to that of standard 21, and may be held to the shovel or blade by clips, as in the said standard.

Having thus fully described my invention, I claim as new and desire to secure by Letters Patent—

1. In a ditcher and scraper, upper and lower bars, 10 11, rigidly connected at their front and rear ends, in combination with the shovel pivotally connected at or near its center to the rear ends of said arms, and the outer bars, 28 29, pivotally connected with the shovel at opposite sides of its center at their rear ends, and detachably connected at their forward ends to the frame formed by the said rigidly-connected bars, substantially as set forth.

2. The combination, with the frame comprising the upper and lower longitudinal bars, 10 11, rigidly connected together and provided with hooks 31, one in advance of the other, of the shovel 20, centrally pivoted to the rear end of the frame, and the rods 28 29, bent downward at their rear ends and pivotally connected to the shovel at opposite sides of its center and bent inward at their front ends to engage the said hooks, substantially as set forth.

3. The combination, with a clevis-link or slide, of bars 10 and 11, a knob connected to the forward ends of said bars, a shovel, 20, the standard of which passes between the bars 10, a wear-plate or washer, 27, connections between the standard and the shovel, bars 28 and 29, formed with hooks 30, and the hooks 31, substantially as described.

JAMES M. HOLLAND.

Witnesses:
RALPH W. ALLSUP,
HUGH O'HARE.